(No Model.)

W. E. BROCK.
BARBED WIRE FENCING.

No. 293,412. Patented Feb. 12, 1884.

Witnesses;
Geo. T. Pinckney
Harold Serrell

Inventor;
William E. Brock.

United States Patent Office.

WILLIAM E. BROCK, OF NEW YORK, N. Y., ASSIGNOR TO THE WASHBURN & MOEN MANUFACTURING COMPANY, OF WORCESTER, MASSACHUSETTS.

BARBED-WIRE FENCING.

SPECIFICATION forming part of Letters Patent No. 293,412, dated February 12, 1884

Application filed December 17, 1881. (No model.)

*To all whom it may concern:*

Be it known that I, WILLIAM E. BROCK, of New York city, in the county and State of New York, have invented certain new and useful Improvements in Barbed-Wire Fencing; and I do hereby declare that the following is a full, clear, and exact description of the same, reference being had to the accompanying drawings, forming a part of this specification, in which—

Figure 1:
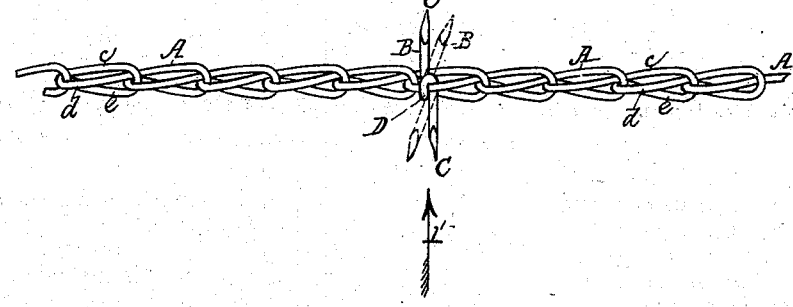
Figure 2:
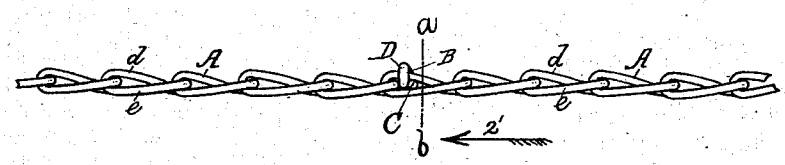
Figure 3:
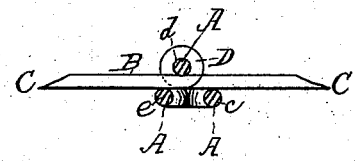

Figure 1 represents a section of my improved barbed fencing complete. Fig. 2 represents a side view of the section of fencing shown in Fig. 1, looking in the direction of arrow 1' of the same figure. Fig. 3 represents on an enlarged scale a section on line *a b*, Fig. 2, looking in the direction of arrow 2' of the same figure.

To enable those skilled in the art to which my invention belongs to make and use the same, I will proceed to describe it more in detail.

In the drawings a single strand of wire, A, is looped or interlocked in such a manner as to make a fencing composed of a series of loops, *c*, *d*, and *e*, as shown in the drawings, while a barb-wire, B, is coiled around one of the loops, in this instance around the loop *d*, as shown at D in the drawings, said barb-wires B being combined with the looped fencing at suitable distances apart, and the points C C projecting in opposite directions from the loop D. The projecting ends C C of the barbed piece B rest upon the loop parts *c e* of the fencing, as shown in Fig. 3, the looped part *d* being encircled by the loop D of the barbed piece B, as before explained, while at the same time this construction permits the barbed ends C C to swing or move back and forth, so as to occupy oblique positions in respect to a longitudinal line of the fencing, as shown in dotted lines, Fig. 1.

From the foregoing description it will be seen that a fencing is secured presenting quite a large and conspicuous surface to the eye of animals in fields inclosed with it, while at the same time it will be elastic, conforming to the various temperatures of the season. Then, again, it will be observed that the barb-points C C of the barb-wire B can swing around into inclined positions, as indicated in dotted lines, Fig. 1, whereby when an animal runs against one of the points such point will swing and draw out as the animal passes along, thereby preventing a deep tear in the skin or flesh of the animal.

Having described my improvements in barbed-wire fencing, what I claim therein as new and of my invention, and desire to secure by Letters Patent, is—

A metal fencing comprising a single wire looped after the manner of a chain or crochet strip, as indicated, and provided with suitable barbs, substantially as described.

WILLIAM E. BROCK.

Witnesses:
   GEO. T. PINCKNEY,
   HAROLD SERRELL.